July 1, 1930.  W. F. KOELPIN  1,768,987
SPOT WELDING MACHINE
Filed Nov. 5, 1928  4 Sheets-Sheet 4
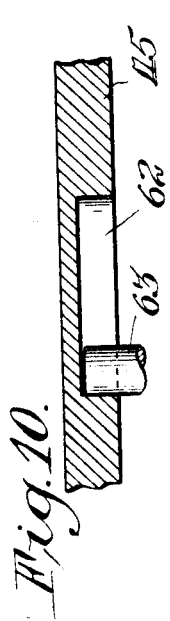
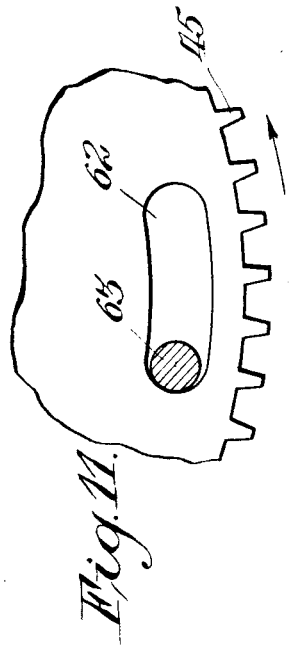
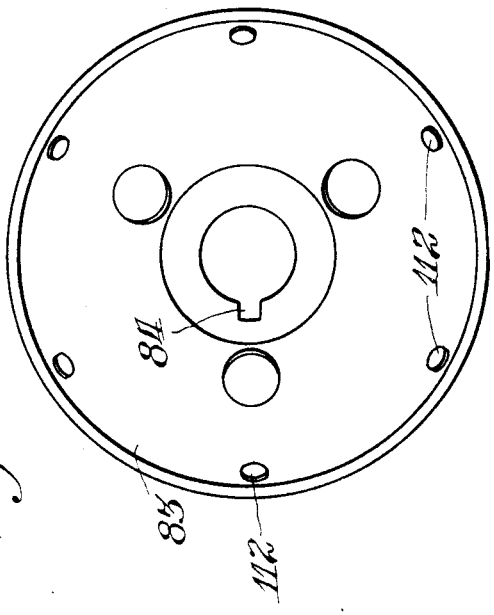
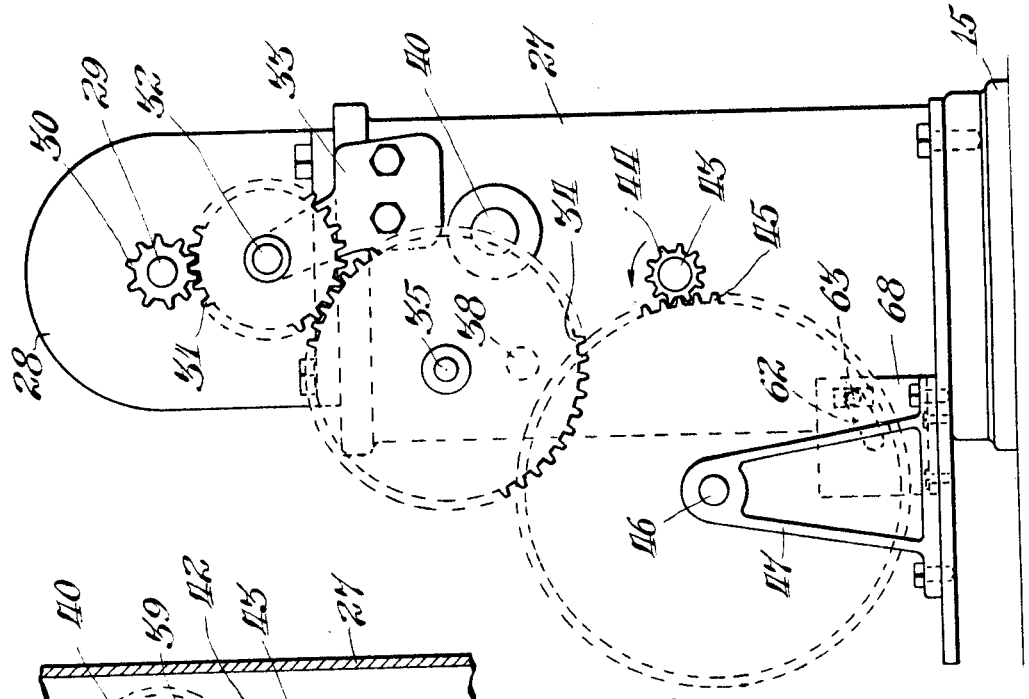
Inventor.
William F. Koelpin,
By H. P. Doolittle,
Atty.

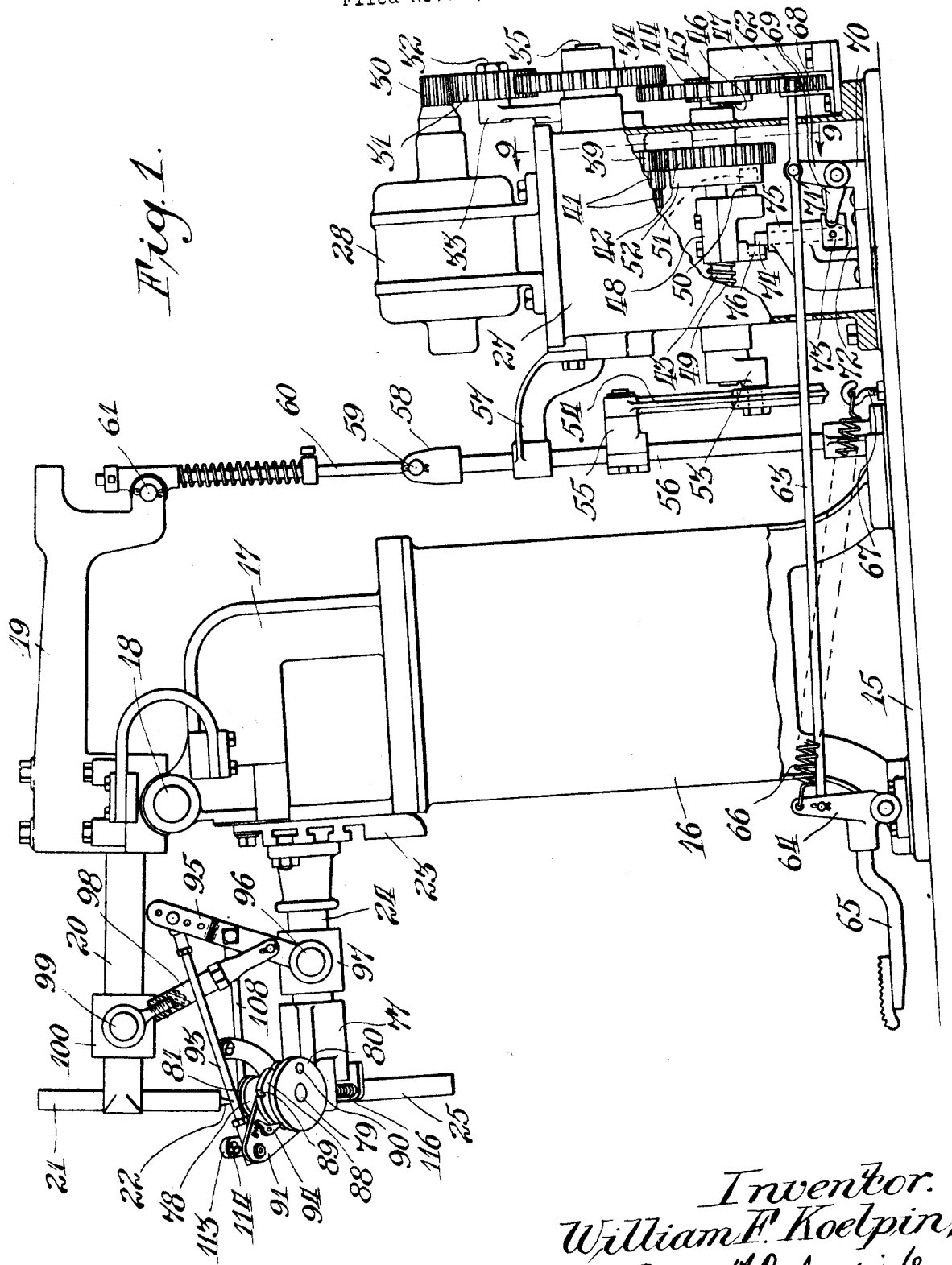

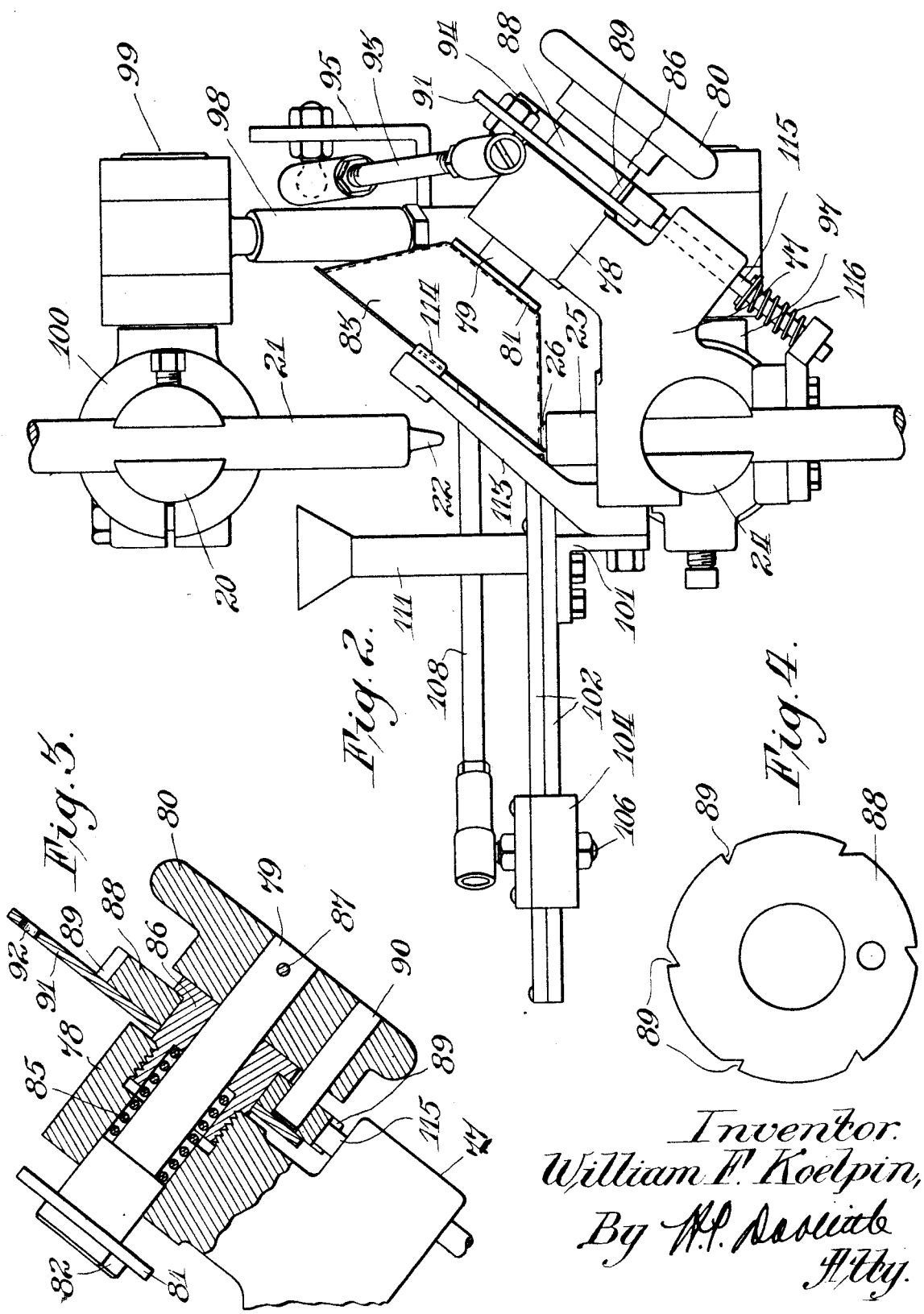

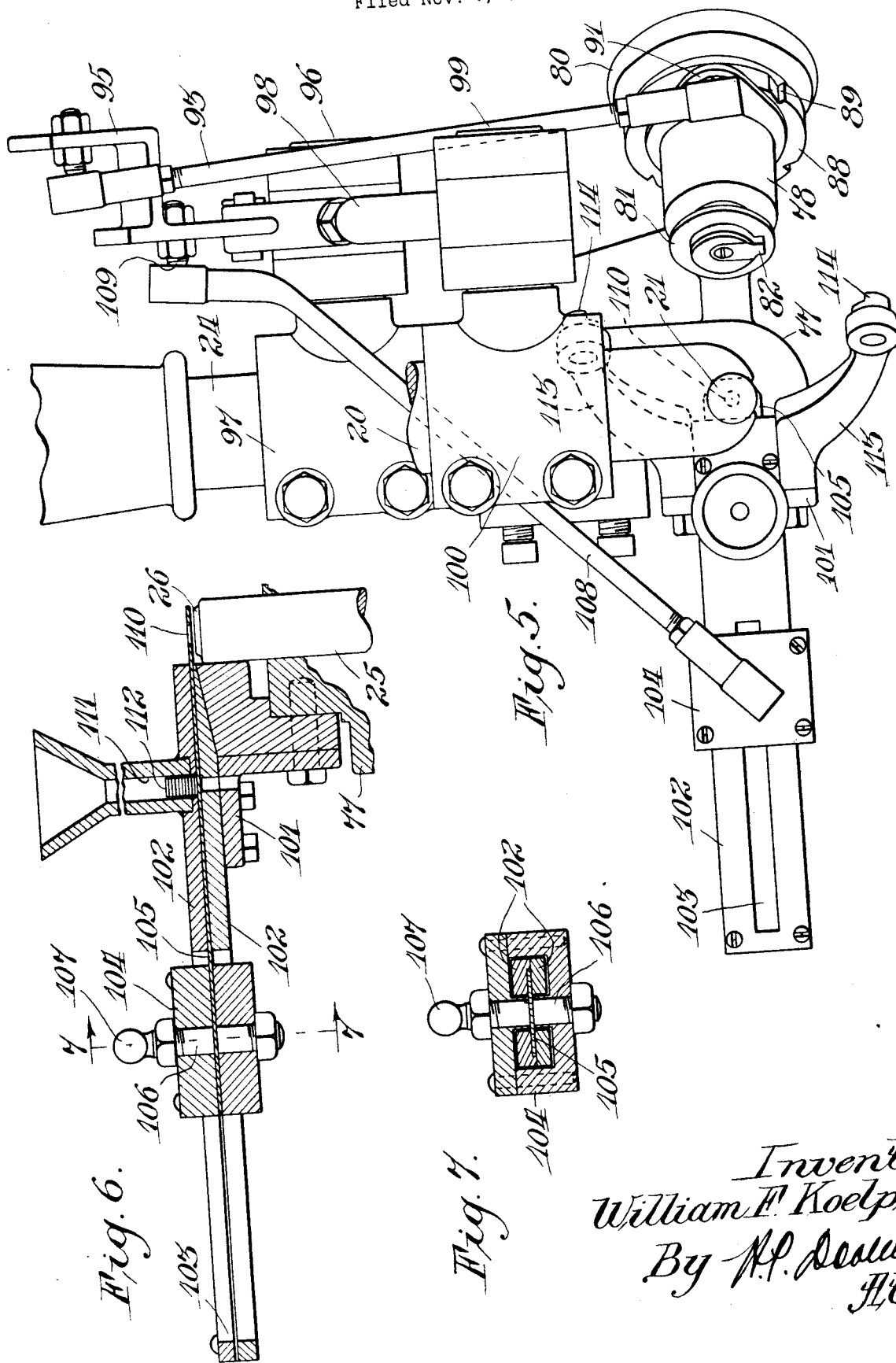

Patented July 1, 1930

1,768,987

UNITED STATES PATENT OFFICE

WILLIAM F. KOELPIN, OF MILWAUKEE, WISCONSIN, ASSIGNOR TO INTERNATIONAL HARVESTER COMPANY, A CORPORATION OF NEW JERSEY

SPOT-WELDING MACHINE

Application filed November 5, 1928. Serial No. 317,182.

The invention is in a spot welding machine.

Spot welders of standard construction usually comprise a pedestal upon which is mounted a rocker beam, one end of which carries a movable spot welding electrode, while beneath this rocker beam a frame support extends from the pedestal and carries the stationary welding electrode. A power drive arrangement controlled by the operator, usually by means of a foot treadle, starts and stops to rock the beam to move the movable electrode into and out of contact with the stationary electrode. The work to be spot welded is placed between the electrodes and, when the electrodes contact, the current passes between them creating an arc which causes the weld.

Certain kinds of work call for a plurality of spaced spot welds, an example of such work being the conically shaped disk which is employed in centrifugal type cream separators. Such work must be provided with a plurality of buttons spaced regularly around the inner periphery of the disk at intervals thereon, and such buttons serve as spacers, so that a pack of these disks may be telescoped, one on top of the other, to create a pile of such disks, each slightly spaced apart to form the inner mechanism of the bowl in a centrifugal cream separator. Heretofore, when these spacers, or buttons as they may be called, were fixed at spaced intervals on the inner periphery of such disks, the operator of the spot welding machine had to place the button by hand on the disk and then hold it on the stationary electrode, and, finally, when the parts were properly placed to be welded, a foot treadle was actuated so that the power drive would rock the beam and the movable electrode thereof into contact with the button to weld the same onto the disk. This operation had to be repeated successively for each succeeding button to be welded to the disk. Of course, this hand feeding and placing of the spacer button was tedious and took time. It was also dangerous to the operator of the machine. The operation also took more time because the operation had to be repeated a plurality of times for each disk, as such disks are usually provided with from three to six of such spacer buttons. It is thus highly desirable that some means be provided for speeding up this spot welding operation and to eliminate the danger to the operator.

With this introduction in mind, it is an object of this invention to provide an attachment for spot welding machines of the kind described, which will automatically, once the disk has been placed in a work holder, and when a foot lever has been tripped by the operator, weld the first button and then automatically, successively place the remaining buttons, one at a time, and weld the same to the disk in proper order, it being understood that the work will be periodically rotated by an indexing device.

Another object is to provide an automatic stop mechanism which will stop the power drive after the last button has been welded to the work.

Another object is to provide a novel form of work holder with means for rotating the holder and the work by means of an index device operating automatically to bring the successive proper spots on the work in position to receive the button and in position to be welded to the work.

Another object is to provide a button feeding mechanism which will function properly to place the buttons on the work and hold each button in such proper position while it is being welded to the work.

Another object is generally to provide an improved attachment of the kind stated and for the purpose stated, which will materially speed up production of cream separator disks or the like and lessen the manufacturing cost thereof.

Other objects should be apparent to those skilled in this art as the description of the invention proceeds.

These very desirable objects are accomplished in the illustrative embodiment of the invention herein to be shown, in the provision of a semi-automatic attachment for a spot welding machine of standard construction, which machine, as has been stated, comprises a pedestal carrying a power driven rocker beam provided with a movable electrode attached thereto to contact work held in position on the stationary electrode. The support which carries the stationary electrode carries an improved work holder which is periodically rotated with the work when the rocker beam rocks.

The movement of the rocker beam is also utilized to operate a button feeding mechanism which slides a button into place on the work and holds the same in position to be welded to the work. Means is also provided, after the predetermined number of welds have been made on the work, automatically to stop the drive to hold the rocker beam still, so that the operator may remove the work from the holder and place thereon a new piece of work to be welded. A foot treadle is operated, the power drive once more starts, and the feeding and welding operation then repeats while the work is automatically turned with its holder in the manner generally described.

In the accompanying sheets of drawings illustrating a practicable form of this invention,—

Figure 1 is a general side elevational view of a standard spot welding machine with the attachment of this invention associated therewith;

Figure 2 is a general front elevational view of the button feeding and work holding mechanisms, shown on a somewhat enlarged scale;

Figure 3 is an enlarged detail view (partly in section) illustrating the work holding chuck;

Figure 4 is a detail face view of the index wheel;

Figure 5 is a top plan view of the structure shown in Figure 2;

Figure 6 is a cross sectional view through the button feeding mechanism;

Figure 7 is a cross sectional view of the same structure taken along the line 7—7 shown in Figure 6 and looking in the direction of the arrows;

Figure 8 is an end view of the power driven attachment which operates the spot welding machine, the view being from the right to the left, as shown in Figure 1;

Figure 9 is a detail elevational view of a part of the drive mechainsm as seen along the line 9—9, looking in the direction of the arrows shown in Figure 1;

Figures 10 and 11 are, respectively, sectional and face views of a portion of the gear wheel with which is associated the stop mechanism which functions automatically to stop the drive when the welding operation on a certain piece of work has been completed; and, Figure 12 is a face view looking into a cream separator disk, to illustrate the kind of work the present invention does.

The spot welding machine is cairred on a base 15 which, in turn, carires a pedestal 16 upon which is mounted at its top a supplementary frame block 17 provided with a pivot shaft 18, which pivotally carries a rocker beam 19. This beam 19 carries an arm 20 in which is mounted in the usual manner the movable electrode 21 having a spot welding point 22 at its lower end. The block 17 carries a bracket 23 in which is mounted a lower arm 24 carrying a stationary electrode 25 having at its upper end a stationary point 26 in line with the electrode 21, as best shown in Figures 1 and 2.

The base 15 carries another pedestal or housing 27 on the upper end of which is mounted an electric motor 28 having its shaft 29 extended to receive and drive a small gear 30. The gear 30 meshes with an intermediate gear 31 on a counter-shaft 32 journaled in a bracket 33 suitably affixed to the housing 27. The gear 31 is in mesh with and rotates a considerably larger gear 34 mounted on a counter-shaft 35 at the exterior of the housing 27. The shaft 35 extends into the housing and there carries a small gear 36 (see Figure 9), which drives a gear 37, also within the housing 27, said gear 37 being on a shaft 38 (see also Figure 8), said gear 37 driving a somewhat larger gear 39 on a shaft 40, also arranged inside the housing 27. The shaft 40 adjacent the gear 39 carries a series of smaller stepped gears 41, which serve as speed changing gears to regulate the speed of operation of the drive, as is usual in these machines.

The gear 39 drives a somewhat larger gear 42 loosely mounted on a shaft 43, which shaft 43 protrudes through the exterior side of casing 27, and there carries a small spur gear 44 affixed thereto. The gear 44 is in mesh with and drives a very large gear 45 on a counter-shaft 46 carried in a bracket 47 made fast to the lower part of the casing 27 (see Figure 1). This large gear 45 functions as a master or control gear, as will later appear. The shaft 43 within the casing 27 slidably carries a clutch element 48 normally pressed by a spring 49 to hold a clutch jaw 50 thereof into engagement with a clutch pocket 51 in an extension 52 formed as a part of the gear 42.

The shaft 43 also protrudes through the opposite side of the casing 27 and there carries, as shown in Figure 1, a crank 53, to which is connected a pitman 54 that has at its upper end pivotal connection with a block 55 made fast to an upright arm 56 journaled for sliding movement in a bracket 57 carried on the casing 27. The upper end of the arm 56 is provided with a block 58 to which is pivotally connected at 59 an upright arm 60 that has pivotal connection at its upper end at 61 with the rearward end of the rocker beam 19.

It can now be seen that when the motor 28 runs, through the gearing mechanism described, the shaft 43 will cause reciprocation of the arm structure 56, 60 to push and pull the back end of the rocker beam 19, which will pivot on its carrying shaft 18 and cause the movable electrode 21 to engage or contact the lower electrode 25 and then separate therefrom with an up and down movement, as will be obvious.

When the welding operation has been completed, as will later appear, it is, of course, necessary to provide a stop mechanism which will hold the parts idle, and such mechanism will next be described. This mechanism takes the form of a clutch throw-out and acts automatically. Adjacent the periphery of the large gear 45 is a cut-out or groove 62 which is adapted to receive the end of a rod 63, which is connected to a crank 64 formed as a part of a foot treadle 65. A spring 66 connected to the crank 64 and to a hook 67 on the base 15 acts always to pull the rod 63 in a direction to the right, as viewed in Figure 1, so that the end of the rod 63 will yieldingly ride the inner face of the gear 45, and, when the notch 62 registers with the end of the rod 63, it causes the end of the rod to fall into the notch. This permits a clutch control rod, later to be described, to function; and, also the gear 45 will be held against rotation. Better to absorb the shocks to which this rod end is put, said rod is passed through a bracket 68 secured to the bracket 47. At the same time that the rod end stops the gear 45, or in fact an instant sooner, it is necessary to throw out the clutch 48 to disconnect its part 50 from the pocket 51 and thereby stop reciprocation of the arm structure 56—60. This is accomplished by mounting a bell crank lever 69 in a bracket 70 on the base 15, one arm of the bell crank lever being connected at 71 to the rod 63 and the other arm having connection at 72 with a block 73 that carries an upright rod 74 slidable in a bearing 75 carried on the base 15 of the machine. The rod 74 cooperates with a cam surface 76, shown in Figure 1, so that when the rod 74 is in position to contact said surface 76 and when the clutch part 48 turns, it causes the clutch part 48 to be moved to the left, as shown in Figure 1, by a camming action against the force of the spring 49 to disconnect the clutch part 50 from the clutch part 51 on the loose gear 42, which will stop the drive to the rocker beam 19 in an obvious manner. It can now be seen that when the groove 62 is in registration with the end of the rod 63 the spring 66 pulls the rod into said groove, and, when the rod end contacts the end of the groove, clutch control rod 74 is enabled to function to stop the gear wheel 45. At the same time, or just an instant there-before, the rod 63 also operates the bell crank lever 69 and causes the upper end of the rod 74 to engage the cam surface 76 formed on the clutch part 48, which due to rotation of the part 48 slides the clutch part 48 to the left to disengage the same from the gear 42, and in this fashion the rocker beam 19 is held idle with the movable electrode 21 out of contact with the stationary electrode 25.

The arm 24 carries at its outer end a stationary support bracket 77, said bracket having a sleeved extension 78 (see Figures 2, 3 and 5). The work holder structure of this invention is mounted in this sleeve 78 and comprises a shaft 79 having at its lower exposed end a hand wheel 80 and at its upper end a stop 81 and a fixture 82 of a shape to fit the kind of work to be welded.

The particular kind of work in this case is a cone-shaped cream separator disk 83, shown in Figure 12, having a central opening and notch 84 which will lock on the fixture 82 heretofore described, so that the work 83 will turn with the shaft 79 in the manner about to be described. A spring 85 is arranged within the sleeve 78 and is held in place therein by a nut 86, against which the hand wheel 80 fits, the hand wheel being made fast by a pin 87 to the shaft 79. The spring 85 acts to push the stop 81 and fixture 82 to a position where it will be spaced from the upper edge of the sleeve 78, as shown in Figure 3. The outer surface of the nut 86 forms a bearing upon which rotates an index wheel 88 (see also Figure 4), having spaced regularly around its periphery notches 89 corresponding in number to the number of welding operations to be performed on the piece of work. In the case of the cream separator disk, there are 6 buttons to be spot welded thereon, and accordingly there are 6 notches 89 in the index wheel 88. A pin 90 connects the hand wheel 80 with the index wheel 88. A lever 91 is loosely journaled on the hub of the nut 86, and at its upper end it has an eye 92 to which is pivotally connected a link 93. The lever 91 carries a pawl 94 (see Figure 1), which pawl engages in the notches 89 of the index wheel 88 periodically to move the same. As will be seen from the showing in Figure 3, when the index wheel 88 moves, the pin 90 causes the hand wheel 80 to turn also. The shaft 79 then turns and likewise the stop 81 and fixture 82, and, as the work 83 is locked to the fixture 82, the work also must turn. When the welding operation on the work has been completed, the operator grasps the wheel 80 and pulls the shaft 79 in an axial or endwise direction against the force of the spring 85 to release the fixture 82 from the notch 84 in the work 83. Another piece of work is then mounted on the stop 81 and fixture 82 and the spring 85 then automatically pulls the parts back to the normal position shown in Figure 3 when the operator releases the hand wheel 80.

The link 93 has its opposite end pivotally connected to an arm 95 which has its lower end pivotally connected at 96 to a block 97 secured to the arm 24, as best shown in Figures 1 and 5. A toggle connection 98 connects an intermediate part of the lever 95 pivotally to a pin 99 on a block 100 made fast to the upper arm 20. It can now be seen that every time the electrode 21 moves upwardly away from the lower electrode 25, as at the completion of a spot welding operation, the upward movement of the beam 20 causes the toggle 98 to rock the arm 95 which moves the link 93, causing the arm 91 to turn the index wheel 88 one-sixth of a turn, by means of the pawl 94.

The button feeding and positioning means will next be described. Secured to the bracket 77 is a support 101 (see Figure 6), which carries two slightly spaced apart plates 102 provided with a long guideway or slot 103 in which is caused to reciprocate in a manner to be described, a block 104 to which is connected a feeder member 105 by means of a bolt 106 having a ball head 107. The head 107 is connected by a pivoted link 108 to another pivot ball and socket structure 109 to the lever or arm 95. It will be seen that every time the arm 95 swings, the link 108 will reciprocate the block 104 and the feeder strip 105. The feeder strip, as best shown in Figure 6, has at its free end an aperture 110, which is adapted to register with the bottom of a chute 111 filled with buttons 112, the parts being so proportioned that every time the opening 110 registers with the stack of buttons in the chute 111, one button will be dispensed by gravity from the stack into the hole 110. When the feeder strip 105 is reciprocated, the button 112 now lodged in the opening 110 is brought into position on the work 83 above the point 26 of the lower electrode 25. Thus, the button is in position to be spot welded to the work.

It will be seen that the button dispensing and placing mechanism is timed to cooperate with the welding operation and that the timed relationship of the parts is all controlled from the rocking movement of the beam 19. The feeder strip 105 positively holds the button on the work while the weld is made. Between the bracket 77 and the support 101 is clamped a two-armed member or yoke 113, which has each arm provided at its free end with an extension 114, which loosely engages the edge of the work 83, as best shown in Figures 2 and 5. These arms 113 are stationary and the work 83 is merely held against the extensions 114 by means of the spring 85 in the work holding device heretofore described.

After the index wheel 88 has been moved ahead one-sixth of a turn by the pawl 94, a stop rod 115 pressed by a spring 116 (see Figure 2) engages a notch in the lower part of the index wheel to prevent accidental back rotation thereof.

The electrical features of the spot welding machine have not been described, as they are old, it being understood, of course, that the frame parts are insulated appropriately from the electrode carrying arms so that the current will not be grounded and dissipated in the frame of the machine. The toggle link 98 in the invention of this attachment for the spot welding machine will be made of insulated material, so that the current will not be grounded, thus insuring that a hot spot will exist when the electrodes contact the work.

A description of the machine's use and operation will now be recited. The clutch part 48 is disengaged and the end of the rod 63 is pressed by the spring 66 to duty in the groove 62 in the large gear 45. The rocker beam 19 is now idle with the electrode 21 raised, as shown in Figure 1. The operator takes the piece of work and, having pulled the rest or stop 81 with the fixture 82 down, by means of the hand wheel 80, fits the piece of work 83, which is in this instance a cream separator disk, and locks the notch 84 thereof on the fixture 82. Release of the hand wheel by the operator causes the spring 85 to push the shaft 79 and with it the fixture 82 and rest 81 upwardly to its normal operating position, as shown in Figure 3. This causes the periphery of the cream separator disk slidably or loosely to engage the extensions 114 on the bifurcated member 113. The work is now held in position with its edge contacting or resting on the point 26 of the lower electrode 25 as shown in Figure 2. The operator now steps on the foot treadle 65, which releases the end of the rod 63 from the notch in the gear wheel 45, and at the same time the rod 74 is pulled out of the way of the extension, or cam, 76, which causes the spring 49 to move the clutch part 48, which is slidable on the shaft 43, but fast thereon, to rotate therewith, into driving engagement with the gear 42. This drives the crank 53, which in turn reciprocates the vertical rod structure 56, 60 to rock the beam 19. As the arm 20 of the beam 19 moves down, the toggle 98 pushes the arm or lever 95 in a rearward direction, which pulls the link 108 and slides the slide 104 to move a button 112 registered in the opening 110 in the slide or feeder strip 105 into position on the inner face of the cream separator disk at that point where it is resting on the point 26 of the stationary electrode 25. At the instant the button has been brought to rest on the inner face of the disk, the point 22 of the movable electrode contacts the same, causing the current to flow, which creates that necessary hot electric spot that welds the button 112 to the disk. The throw of the crank 53 is now reversed, causing the beam 19 and arm 20 to rise, and, as this happens, the arm or lever 95 is swung to the left, as shown in Figure 1, which pushes the link 93 to rock the lever 91, causing the pawl 94 to move the indexing plate 88 one-sixth of a turn. The spring pressed rod 115 now comes into play to prevent back rotation of the index wheel 88. As shown in Figure 3, as the index wheel 88 turns, the hand wheel 80, shaft 79, stop or rest 81, and fixture 82 also turn one-sixth of a turn and carry the work, or disk, 83 through a similar angular distance, always maintaining the edge of the disk in a substantially horizontal position on the point of the lower electrode.

The large gear wheel 45 is of such a size that it bears a six to one ratio to the small spur gear 44. By this is meant that the small gear 44 makes six complete turns while the large gear 45 makes only one turn. This, then, causes the shaft 43 to impart its movement to the rocker beam 19, 20 six times for this spot welding operation, as that is the number of buttons 112 that are to be welded to the particular piece of work illustrated in this disclosure; to-wit, the disk 83. Now, when the sixth button has been spot welded to the disk, the notch 62 has returned to its initial position where the spring 66 causes the end of the rod 66 to return to the notch. At the instant before this takes place, the rod 74 has disengaged the clutch 48 to stop the drive to the crank 53. Thus, the large gear 45 comes to rest and similarly the drive to the crank 53, having been disconnected, causes the rocker arm 19, 20 to come to rest with the removable electrode 21 raised in its up position, as shown in Figure 1. The predetermined number, which in this instance is six, of welds having been effected, the machine is brought to rest to enable the operator to remove the work and replace it with another piece to be welded. The work is removed by the operator, who grasps the hand wheel 80 and pulls the same down against the force of the spring 85, which releases the fixture 82 from the notch 84 in the disk.

From this detailed description, it can be seen that an attachment for a welding machine has been provided which achieves all of the desirable objects of the invention heretofore recited. It is to be understood that the machine is susceptible of many changes and modifications; for example, the number of welding operations to be performed on any one piece of work may be varied by the character of work involved, by merely substituting a new index wheel having a different number of notches and appropriately timing the other operating parts accordingly. The speed of operation can be varied through the speed changing gears 41.

It is the intention to cover all such changes and modifications which do not materially depart from the spirit and scope of this invention as is indicated in the following claims.

What is claimed is:

1. In a spot welding machine, a work holder, welding means, means for periodically feeding stock to a piece of work on the holder to be welded to the work, means for operating the welding means in timed relation to the feeding means a predetermined number of times to weld the stock to the work, and means controlled by said last mentioned means for periodically turning the work holder the same number of times and in timed relationship to the operation of the welding means.

2. In a spot welding machine, a work holder, welding means, means for operating the welding power means, operator controlled means for starting said operating means, timing means for causing the welding means to effect a plurality of spot welds on a piece of work on the holder, and trip means acting automatically to stop the operation of the welding means when a predetermined number of spot welds have been formed on the work.

3. In a spot welding machine, a rockable beam carrying a movable electrode, driving means for rocking the beam, a stationary electrode, a work holder for holding a piece of work on the stationary electrode, means for feeding stock and placing it on the work to weld the same thereto, and means for controlling the feeding means from the rocker beam.

4. In a spot welding machine, a rocker beam carrying a movable electrode, driving means for rocking the beam, a stationary electrode, a work holder for holding a piece of work on the stationary electrode, means for feeding stock and placing it on the work to be welded thereto, means for periodically rotating the work holder and work through a predetermined angular distance, and means for controlling the operation of the feeding means and means which rotates the work holder from the movement of the rocker beam.

5. In a spot welding machine, a stationary electrode, a work holder for positioning work on said electrode, a rocker beam, a movable electrode on said beam, driving means for rocking the beam, operator controlled means for starting the driving means, said driving means including control mechanism for causing the rocker beam to operate the movable electrode a predetermined number of times, and an automatically acting stop mechanism to stop the rocker beam when it has completed its predetermined number of operations.

6. In a welding machine, a rocker beam carrying a movable electrode, driving mechanism for operating said rocker beam, a stationary electrode, a work holder for holding work in position to be welded on said stationary electrode, means for feeding stock to the work to be welded thereto, means included in the work holder for rotating the work periodically in timed relation to the stock feeding mechanism, and control means in said driving mechanism for causing a predetermined number of pieces of stock to be welded to said work in spaced relation thereon.

7. In a spot welding machine, a stationary electrode, a rocking member carrying a movable electrode, a work holder for holding work on the stationary electrode, a toggle link pivotally connected to the rocker means, means operated by said toggle link for periodically rotating the holder and work through a predetermined angular distance, means for feeding stock and holding it in position on the work so that it may be welded thereto, and means controlled from the rocker beam and toggle link for moving the stock by the feeding mechanism in timed relationship to the means which turns the work holder and work.

8. In a spot welding machine, a stationary electrode, a movable electrode, a work holder for positioning work on the stationary electrode, means for rotating the work holder and the work therewith, said work holder being movable endwise of its direction of rotation to displace the work therefrom, and stationary means for loosely engaging an edge of the work to hold the same in proper position relative to the stationary electrode as the work is turned.

9. In a spot welding machine, a rocker structure carrying a movable electrode, a stationary electrode, a work holder for positioning work on the stationary electrode, means operated by the rocker structure for indexing the work holder successively a predetermined number of times through a predetermined angular distance, and means for feeding stock and placing it on the work in position to be welded, said means also being controlled by the rocker structure and timed to operate in proper relationship with the work indexing means.

10. In a spot welding machine, a rocker structure carrying a movable electrode, a stationary electrode, driving means for rocking the rocker beam a predetermined plurality of times, and stop mechanism embodying a timed trip for holding the rocker structure idle after it has operated the predetermined plurality of times.

11. In a spot welding machine, a rocker structure carrying a movable electrode, a stationary electrode, means for driving the rocker structure, said means including a clutch, means in the driving mechanism for causing the rocker structure to operate a predetermined number of times, and stop mechanism co-operating with said control means and acting to disconnect the clutch to stop the rocker structure after it has operated the predetermined number of times.

12. The combination with a spot welding machine having a stationary electrode and a movable electrode, of work holding means, means for feeding stock to the work on the holder, and means operable by the movement of the movable electrode for indexing the work rotatively step by step and for regulating the feeding of the stock and placing it on the work to be welded in proper timed relationship.

13. The combination with a spot welding machine having a stationary electrode and a movable electrode, of a work holder adapted to carry a cream separator disk, means for placing a button and holding it on said disk to be welded thereto, and means driven and controlled by the movement of the movable electrode for thereafter successively turning the work and placing buttons thereon in timed relation to the welding operation to cause a predetermined number of buttons to be welded to the disk.

14. In a welding machine, a frame, relatively movable electrodes carried by the frame, a work holder rotatably carried on the frame, means for turning said holder, said holder adapted to locate a piece of work on one of the electrodes, a slide device on the frame for feeding stock into position on the work to be welded thereto, and means controlled by movement of one of the electrodes for operating the slide device and indexing the work holder with its work rotatively in timed relationship to each other and to the movement of said electrode.

15. In a welding machine, a frame, relatively movable electrodes carried by the frame, a work holder movably carried on the frame, means for moving said holder in a step by step manner, said holder adapted to locate a piece of work on one of the electrodes, a device on the frame for feeding stock into position on the work to be welded thereto, and driving means operable by the movement of one of the electrodes for operating the stock feeding device and moving the work holder in timed relationship to each other and to the movement of said electrode.

16. In a welding machine, a frame, relatively movable electrodes carried by the frame, a work holder movably carried on the frame, means for moving said holder intermittently, said holder adapted to locate a piece of work on one of the electrodes, a device on the frame for feeding stock into position on the work to be welded thereto, driving means for moving one of the electrodes, means controlled by the movement of said electrode for operating the work holder and feeding device in timed relationship to each other and to the movable electrode, and timing means included in the driving means for regulating the number of welds to be performed on the work.

In testimony whereof I affix my signature.

WILLIAM F. KOELPIN.

CERTIFICATE OF CORRECTION.

Patent No. 1,768,987. Granted July 1, 1930, to

WILLIAM F. KOELPIN.

It is hereby certified that error appears in the printed specification of the above numbered patent requiring correction as follows: Page 5, line 78, cliam 2, before the word "means" second occurrence, insert the word power, and line 79, same claim, strike out the word "power"; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.